United States Patent
Zhang et al.

(10) Patent No.: US 11,628,417 B2
(45) Date of Patent: Apr. 18, 2023

(54) METHOD AND REACTOR FOR SEPARATING AND REMOVING HEAVY METALS FROM WASTEWATER USING SULFHYDRYL-MODIFIED NANO-MAGNETIZED ACTIVATED CARBON

(71) Applicant: Dalian Maritime University, Dalian (CN)

(72) Inventors: Jin Zhang, Dalian (CN); Qing Su, Dalian (CN)

(73) Assignee: Dalian Maritime University, Dalian (CN)

( * ) Notice: Subject to any disclaimer, the term of this patent is extended or adjusted under 35 U.S.C. 154(b) by 115 days.

(21) Appl. No.: 17/216,976

(22) Filed: Mar. 30, 2021

(65) Prior Publication Data

US 2022/0080383 A1    Mar. 17, 2022

(30) Foreign Application Priority Data

Sep. 15, 2020 (CN) .......................... 202010970568.1

(51) Int. Cl.
| | |
|---|---|
| *B01J 20/20* | (2006.01) |
| *B01J 19/00* | (2006.01) |
| *B01J 20/28* | (2006.01) |
| *B01J 20/30* | (2006.01) |
| *C02F 1/28* | (2023.01) |
| *C02F 1/48* | (2023.01) |
| *C02F 101/20* | (2006.01) |

(52) U.S. Cl.
CPC ......... *B01J 20/205* (2013.01); *B01J 19/0066* (2013.01); *B01J 20/28009* (2013.01); *B01J 20/28064* (2013.01); *B01J 20/28073* (2013.01); *B01J 20/3042* (2013.01); *C02F 1/288* (2013.01); *C02F 1/488* (2013.01); *B01J 2220/42* (2013.01); *C02F 1/281* (2013.01); *C02F 1/283* (2013.01); *C02F 2101/20* (2013.01); *C02F 2201/002* (2013.01); *C02F 2303/18* (2013.01)

(58) Field of Classification Search
CPC ...... B01J 20/20; B01J 20/205; B01J 19/0066; B01J 20/28009; B01J 20/28064; B01J 20/28073; B01J 20/3042; B01J 2220/42; C02F 1/288; C02F 1/488; C02F 1/281; C02F 1/283; C02F 2101/20; C02F 2201/002; C02F 2302/18
USPC ........................................................ 502/417
See application file for complete search history.

(56) References Cited

FOREIGN PATENT DOCUMENTS

CN            111170436 A  *  5/2020  .............. C02F 1/283

\* cited by examiner

*Primary Examiner* — Edward M Johnson
(74) *Attorney, Agent, or Firm* — Notaro, Michalos & Zaccaria P.C.

(57) ABSTRACT

A method and reactor are disclosed for separating and removing heavy metals from wastewater using a sulfhydryl-modified nano-magnetized activated carbon. The method includes the steps of preparing a sulfhydryl-modified nano-magnetized activated carbon first; introducing heavy-metal-containing wastewater into a reactor which is equipped with a stirrer and keeping stirring, and then adding the sulfhydryl-modified nano-magnetized activated carbon, continuously stirring for a reaction; after reacting for a period, precipitating under a magnetic field generated by a magnet separator, discharging the resulting supernate, and then discharging the precipitated sludge.

1 Claim, 1 Drawing Sheet

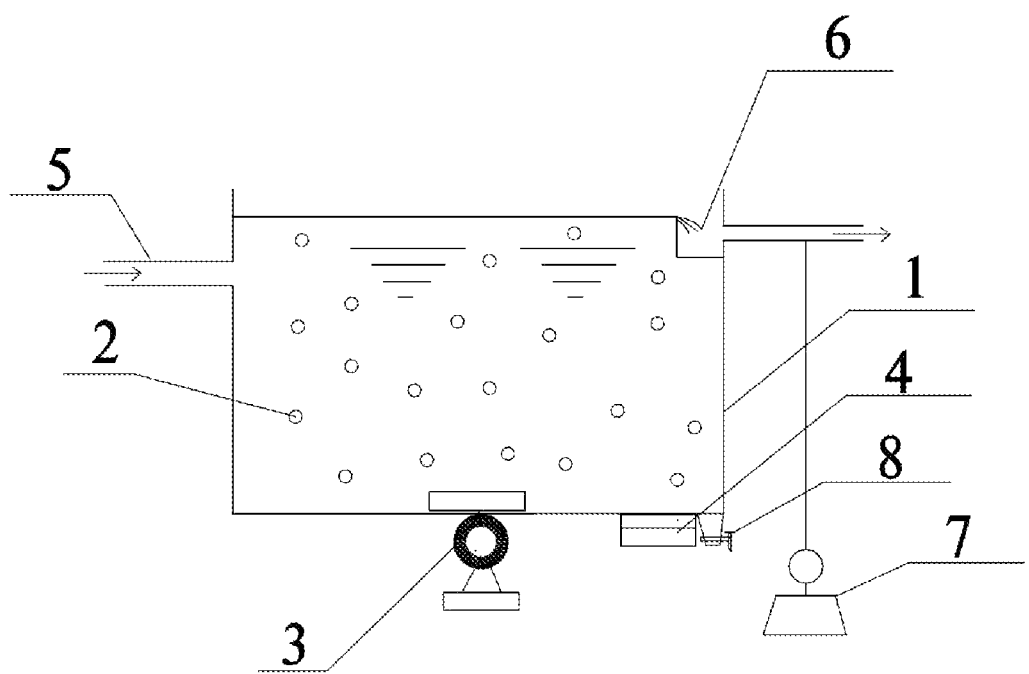

METHOD AND REACTOR FOR SEPARATING AND REMOVING HEAVY METALS FROM WASTEWATER USING SULFHYDRYL-MODIFIED NANO-MAGNETIZED ACTIVATED CARBON

CROSS REFERENCE TO RELATED APPLICATION

This application claims the priority of Chinese Patent Application No. 202010970568.1, filed on Sep. 15, 2020, entitled "Method and reactor for separating and removing heavy metals from wastewater using sulfhydryl-modified nano-magnetized activated carbon", which is incorporated herein by reference in its entirety.

TECHNICAL FIELD

The present disclosure relates to the technical field of the treatment of heavy-metal-containing wastewater, and in particular relates to a method and reactor for separating and removing heavy metals from wastewater using a sulfhydryl-modified nano-magnetized activated carbon.

BACKGROUND

With the rapid development of industrial production, the use of heavy metals and the resultant emissions are increasing. In view of this, heavy metal pollution has become a serious environmental problem, which has aroused widespread concern. At present, the municipal wastewater generally contains heavy metal ions. Heavy metal ions are usually toxic to organisms, and as a result, they will have an impact on conventional biological treatment of wastewater; moreover, the conventional wastewater treatment process has a limited effect on the removal of heavy metals, and after the wastewater treatment, most of heavy metal ions would be transferred into a surplus sludge, which seriously hinders the resource utilization of the surplus sludge. Since the surplus sludge comprises complex compositions and is difficult to treat because of the influence of sludge morphology, the treatment effect of heavy metals in sludge is not ideal. Therefore, when considering heavy metal reduction, the most effective way is to increase the in-situ removal of heavy metals from wastewater through certain pretreatment, so as to effectively decrease the content of heavy metals in surplus sludge and reduce the impact of heavy metals on the environment.

Adsorption is a convenient and effective method for removing pollutants in water, including heavy metal ions. In respect of removal of the pollutants, the adsorption is not only fast and efficient, low in cost, and simple for operation, but also has no secondary pollution, and the adsorbent used therein could be reused; therefore, adsorption has a broad application and development prospect in the treatment of refractory pollutants.

Adsorbents with excellent performance plays a key role in the application and development of adsorption technology. Activated carbon is a conventional and widely used adsorbent, which has advantages of high specific surface area and abundant pore structure, and strong adsorption capacity for pollutants in water, but has disadvantage of poor selectivity. Ferroferric oxide is recognized as a green (i.e. environmental-friendly) adsorbent, which exhibits a high adsorption efficiency and a good external magnetic field response characteristics, and could be easily separated from a pollution system by a magnetic separation technology. Among others, nano-ferroferric oxide, as a new adsorbent, has strong superparamagnetism in addition to all characteristics of nano-particles, which makes it possible to quickly separate from a liquid and increase its reuse rate. However, nano-ferroferric oxide has a high degree of agglomeration, which has a certain functional impact on its adsorption application. Therefore, conventional activated carbon and nano-ferroferric oxide are selected to be functionally coupled, so as to obtain a green magnetized adsorbent with a strong functional adsorption and better separation, which effectively utilizes the performance advantages of conventional adsorbents and modern adsorbents, improving the performance characteristics of adsorbents, and solving the technical problems in the development of heavy metal adsorbents. In addition, using a functional material for surface treatment makes it possible to improve the selectivity of activated carbon and significantly improve the separation and removal efficiency of heavy metals. Therefore, it is of great research significance to develop a method for separating and removing heavy metals from wastewater using a sulfhydryl-modified nano-magnetized activated carbon, so as to solve the technical difficulties of heavy metal adsorption treatment, and realize the source reduction of heavy metals in wastewater.

SUMMARY

To address the above technical problems, the present disclosure provides a method and reactor for separating and removing heavy metals from wastewater using a sulfhydryl-modified nano-magnetized activated carbon.

The technical solutions provided by the present disclosure are as follows:

A method for separating and removing heavy metals from wastewater using a sulfhydryl-modified nano-magnetized activated carbon, comprising:

step 1, preparing a sulfhydryl-modified nano-magnetized activated carbon: adding an activated carbon into a mixed solution of $FeCl_2$ and $FeCl_3$ for a reduction reaction at a pH value of 10-11, and a temperature of 70-80° C. for 60 min, and then aging at ambient temperature for 24 h, to form $Fe_3O_4$ on the activated carbon, obtaining a nano-magnetized activated carbon, wherein a mass ratio of the activated carbon to $Fe_3O_4$ formed is 1:1, 1:2 or 1:3; subjecting the nano-magnetized activated carbon to a sulfhydryl modification, to obtain a sulfhydryl-modified nano-magnetized activated carbon;

step 2, introducing wastewater: introducing heavy-metal-containing wastewater into a batch reactor via a water inlet pipe;

step 3, stirring: turning a stirring device inside the batch reactor on for stirring;

step 4, adding the sulfhydryl-modified nano-magnetized activated carbon obtained in step 1 into the batch reactor;

step 5, performing an adsorption reaction while stirring in the batch reactor, to adsorb heavy metals in the wastewater by the sulfhydryl-modified nano-magnetized activated carbon, thereby realizing in-situ reduction and removal of heavy metals from the wastewater;

step 6, separating: after the adsorption reaction, precipitating the sulfhydryl-modified nano-magnetized activated carbon under a magnetic field generated by a magnetic separator, obtaining a precipitated sulfhydryl-modified nano-magnetized activated carbon and a supernate;

step 7, opening a water outlet pipe after the separating, to discharge the supernate; and step 8, opening a sludge outlet at the bottom of the batch reactor, to discharge the precipitated sulfhydryl-modified nano-magnetized activated carbon, thereby completing a treatment cycle.

In some embodiments, the activated carbon is in a form of granular.

In some embodiments, in step 1, subjecting the nano-magnetized activated carbon to a sulfhydryl modification is performed as follows:

absolute ethanol is mixed with acetic acid and deionized water to obtain a mixture, and trimethoxysilylpropanethiol is added into the mixture, to obtain a solution of trimethoxysilylpropanethiol, and the nano-magnetized activated carbon is then added to the solution of trimethoxysilylpropanethiol, and soaked at a temperature of 60° C. for 12 hours, to form the sulfhydryl-modified nano-magnetized activated carbon.

A batch reactor for separating and removing heavy metals from wastewater using a sulfhydryl-modified nano-magnetized activated carbon, comprising: an adsorption reaction cell, a thermostatic stirring device and a magnet separator;

wherein the adsorption reaction cell is provided with a water inlet at one side, the water inlet is connected with a water inlet pipe, and the water inlet pipe is insert in a heavy-metal-containing wastewater to be treated; the adsorption reaction cell is provided with a water outlet at the other side, the water outlet is connected with a water outlet pipe, and the water outlet pipe is connected with a self-priming pump for discharging water; the adsorption reaction cell is provided with a sludge outlet at its bottom;

a stirring part of the thermostatic stirring device extends into an accommodating cavity of the adsorption reaction cell; the magnet separator is arranged at the bottom of the adsorption reaction cell, and the sulfhydryl-modified nano-magnetized activated carbon is added into the accommodating cavity of the adsorption reaction cell after introducing the wastewater and turning the thermostatic stirring device on.

The above technical solutions provided by the present disclosure have the following advantages:

(1) In the present disclosure, by magnetizing conventional activated carbon and loading with sulfhydryl for modifying its surface, it is possible to improve the magnetization and adsorption selectivity of the activated carbon, thereby realizing high-efficiency in-situ separation and removal of heavy metals from wastewater and reducing functional obstacles of subsequent sludge recycling. The method provided by the present disclosure is simple for operation and convenient for application.

(2) In the present disclosure, the magnetic nano-$Fe_3O_4$ and the activated carbon are coupled into a whole, so that the surface adsorption performance and applicability of the activated carbon could be improved by means of the nano-effect and the magnetic effect of the magnetic nano-$Fe_3O_4$, and the whole is suitable for treating heavy-metal-containing wastewater.

(3) In the present disclosure, by loading the magnetic nano-$Fe_3O_4$ on the activated carbon, it is possible to effectively avoid the aggregation of the magnetic nano-$Fe_3O_4$, and fully utilize the magnetization deposition separation performance of the magnetic nano-$Fe_3O_4$, thereby facilitating the separation of an adsorbent from water, and the recycling and regeneration treatment of the adsorbent.

(4) In the present disclosure, by modifying the surface of the magnetized activated carbon with a sulfhydryl, it is possible to improve the selective adsorption of heavy metals by the activated carbon, thereby further improving the separation and removal efficiency of heavy metals.

(5) The process provided by the present disclosure is advanced, stable in running and simple in operation, and the device used therein is easy to manage, and therefore this process has a high practicality and economy.

BRIEF DESCRIPTION OF THE DRAWINGS

In order to illustrate the embodiments of the present disclosure or the technical solutions in the prior art more clearly, the drawings used in the embodiments or the description of the prior art will be briefly introduced below. Obviously, the drawings in the following description are some embodiments of the present disclosure, and other drawings could be obtained according to these drawings for those of ordinary skill in the art without paying creative labor.

FIG. 1 is a structural schematic diagram according to an embodiment of the present disclosure.

In the drawing: 1 represents an adsorption reaction cell; 2 represents a sulfhydryl-modified nano-magnetized activated carbon; 3 represents a thermostatic stirring device; 4 represents a magnet separator; 5 represents a water inlet; 6 represents a water outlet; 7 represents a self-priming pump; 8 represents a sludge outlet.

DETAILED DESCRIPTION

It should be noted that the features in different embodiments of the present disclosure could be combined with each other without conflict. The present disclosure will be described in detail with reference to the drawings and embodiments.

In order to make the objectives, technical solutions and advantages of the embodiments of the present disclosure clearer, the technical solutions of the embodiments of the present disclosure will be described clearly and completely with reference to the drawings according to the embodiments of the present disclosure. Obviously, the described embodiments are only part of the embodiments of the present disclosure, but not all of them. The following description of at least one exemplary embodiment is merely illustrative in nature and in no way serves as any limitation on the disclosure and its application or use. Based on the embodiments of the present disclosure, all other embodiments obtained by those of ordinary skill in the art without creative labor shall fall within the protection scope of the present disclosure.

It should be noted that the terms used herein are only for describing specific embodiments, and are not intended to limit exemplary embodiments according to the present disclosure. As used herein, unless the context explicitly indicates otherwise, the singular form is also intended to include the plural form. In addition, it should be understood that when the term "comprising" and/or "including" is used in this specification, it indicates the presence of features, steps, operations, devices, components and/or combinations thereof.

Unless defined otherwise, the relative arrangement of components and steps, numerical expressions and numerical values set forth in these embodiments do not limit the scope of the present disclosure. Meanwhile, it should be clear that for convenience of description, the dimensions of each part shown in the drawings are not drawn according to the actual scale relationship. Technologies, methods and equipment known to those of ordinary skill in the related arts may not be discussed in detail, but under appropriate circumstances, the technologies, methods and equipment shall be regarded as part of the authorization specification. In all examples shown and discussed herein, any specific value should be understood as an example only, not as a limitation. Therefore, other examples of exemplary embodiments may have different values. It should be noted that similar reference numerals and letters indicate similar items in the following drawings, and thus once an item is defined in one drawing, it need not be further discussed in the other drawings.

In the description of the present disclosure, it should be understood that the orientation or positional relationship indicated by orientation terms such as "front", "back", "upon", "below", "left", "right", "horizontal", "vertical", "top" and "bottom", is usually based on the orientation or positional relationship shown in the drawings, which is only for convenience of describing the present disclosure and simplifying the description. Unless otherwise stated, these orientation terms do not indicate or imply that the recited devices or elements must have a specific orientation or be constructed and operated in a specific orientation, and thus they should not be understood as limiting the protection scope of the present disclosure; in addition, the orientation terms "inside" and "outside" refer to the inside and outside relative to the outline of each component itself.

For convenience of description, spatially relative terms, such as "above", "upon", "on the upper surface of", and "on", could be used herein to describe the spatial positional relationship between one device or feature and other devices or features as shown in the drawings. It should be understood that the spatially relative terms are intended to encompass different orientations of the devices in application or operation in addition to the orientations described in the drawings. For example, if the devices in the drawings are inverted, devices that was described as "above" or "upon" other devices or constructions previously will be positioned as "below" or "under" other devices or constructions. Therefore, the exemplary term "above" may include two orientations, i.e. "above" and "below". The device could also be positioned in other different ways (rotated 90 degrees or in other orientations), and the spatially relative description used herein will be illustrated accordingly.

In addition, it should be noted that the words "first" and "second" are used herein to define parts only for convenience of distinguishing corresponding parts. Unless otherwise stated, the above words have no special meaning, and thus they should not be understood as limiting the protection scope of the present disclosure.

The present disclosure provides a method for separating and removing heavy metals from wastewater using a sulfhydryl-modified nano-magnetized activated carbon, comprising:

step 1, preparing a sulfhydryl-modified nano-magnetized activated carbon: adding an activated carbon into a mixed solution of $FeCl_2$ and $FeCl_3$ for a reduction reaction at a pH value of 10-11, and a temperature of 70-80° C. for 60 min, and then aging at ambient temperature for 24 h, to form $Fe_3O_4$ on the activated carbon, obtaining a nano-magnetized activated carbon, wherein a mass ratio of the activated carbon to $Fe_3O_4$ formed is 1:1, 1:2 or 1:3; subjecting the nano-magnetized activated carbon to a sulfhydryl modification, to obtain a sulfhydryl-modified nano-magnetized activated carbon;

step 2, introducing wastewater: introducing heavy-metal-containing wastewater into a batch reactor via a water inlet pipe;

step 3, stirring: turning a stirring device inside the batch reactor on for stirring;

step 4, adding the sulfhydryl-modified nano-magnetized activated carbon obtained in step 1 into the batch reactor;

step 5, performing an adsorption reaction while stirring in the batch reactor, to adsorb heavy metals in the wastewater by the sulfhydryl-modified nano-magnetized activated carbon, thereby realizing in-situ reduction and removal of heavy metal from the wastewater;

step 6, separating: after the adsorption reaction, precipitating the sulfhydryl-modified nano-magnetized activated carbon under a magnetic field generated by a magnetic separator, obtaining a precipitated sulfhydryl-modified nano-magnetized activated carbon and a supernate;

step 7, opening a water outlet pipe after the separating, to discharge the supernate; and step 8, opening a sludge outlet at the bottom of the batch reactor, to discharge the precipitated sulfhydryl-modified nano-magnetized activated carbon, thereby completing a treatment cycle.

As shown in FIG. 1, a batch reactor for separating and removing heavy metals from wastewater using a sulfhydryl-modified nano-magnetized activated carbon, comprising: an adsorption reaction cell 1, a thermostatic stirring device 3 and a magnet separator 4;

wherein the adsorption reaction cell 1 is provided with a water inlet 5 at one side, the water inlet 5 is connected with a water inlet pipe, and the water inlet pipe is insert in a heavy-metal-containing wastewater to be treated; the adsorption reaction cell 1 is provided with a water outlet 6 at the other side, the water outlet 6 is connected with a water outlet pipe, and the water outlet pipe is connected with a self-priming pump 7 for discharging water; the adsorption reaction cell 1 is provided with a sludge outlet 8 at its bottom;

a stirring part of the thermostatic stirring device 3 extends into an accommodating cavity of the adsorption reaction cell 1; the magnet separator 4 is arranged at the bottom of the adsorption reaction cell 1, and the sulfhydryl-modified nano-magnetized activated carbon is added into the accommodating cavity of the adsorption reaction cell 1 after introducing the wastewater and turning the thermostatic stirring device 3 on.

Through sulfhydryl modification and magnetization modification, it is possible to enhance the selective adsorption of heavy metals by activated carbon, thus improving the in-situ separation and removal efficiency of heavy metals from wastewater; meanwhile, the loaded magnetic nano-$Fe_3O_4$ promotes the separation of the activated carbon when using a magnet separator, which is beneficial to the recovery of the adsorbent. By means of the method provided by the present disclosure, the removal rate of heavy metals from wastewater could reach 99% or higher.

EXAMPLE

In the following examples, an activated carbon, a nano-magnetized activated carbon and a sulfhydryl-modified nano-magnetized activated carbon are used to treat target wastewater.

The activated carbon was purchased from Tianda Chemical Reagent Factory, Dongli, Tianjin, China, with a particle size not higher than 0.90 mm-1.80 mm, a specific surface area of 883.7 $m^2/g$ and a total pore volume of 0.58 $cm^3/g$.

The nano-magnetized activated carbon and the sulfhydryl-modified nano-magnetized activated carbon were prepared from the above activated carbon by the following steps:

(1) 23.25 g of $FeCl_3.6H_2O$ and 12.00 g of $FeSO_4.7H_2O$ were dissolved in 300 mL of degassed distilled water to form a mixed solution of $FeCl_3$ and $FeSO_4$; 10 g of the activated carbon was added into the mixed solution, the resulting mixture was heated to 70° C. while stirring in nitrogen atmosphere, and then an aqueous NaOH solution having a concentration of 5 mol/L was dropwise added thereto until the pH value thereof reach 10; the resulting solution was continuously stirred for 1 hour in nitrogen atmosphere, and aged at ambient temperature for 24 hours, to form $Fe_3O_4$ on the activated carbon, obtaining a solution containing a nano-magnetized activated carbon, wherein a mass ratio of the activated carbon to $Fe_3O_4$ formed was 1:1; a solid substance was separated from the solution by a magnet, and washed repeatedly with distilled water and absolute ethanol to neutrality, and then dried at 120° C. in vacuum for 3 hours, to obtain the nano-magnetized activated carbon.

(2) 100 mL of absolute ethanol was mixed with 2 mL of deionized water and 5 mL of acetic acid to obtain a mixture, and 5 mL of trimethoxysilylpropanethiol was added, to obtain a solution of trimethoxysilylpropanethiol in the mixture. 10 g of the nano-magnetized activated carbon obtained from above was added into the solution, and soaked for 12 hours at 60° C. to obtain a solution containing a sulfhydryl-modified nano-magnetized activated carbon; the solid substance was separated from the solution under magnetic field generate by a magnet and washed repeatedly with absolute ethanol and deionized water to neutrality, and then dried at 50° C. in vacuum for 3 hours to obtain the sulfhydryl-modified nano-magnetized activated carbon.

Example 1

The volume of a target wastewater to be treated for an adsorption reaction was 1000 mL;
the temperature of the target wastewater was 25° C.;
the target wastewater contained a heavy metal, $Cu^{2+}$, and an initial concentration of $Cu^{2+}$ in the target wastewater was 5 mg/L;
the initial pH value of the target wastewater was 7.0;
the adsorption reaction was performed for 120 min;
the adsorbent (the activated carbon, the nano-magnetized activated carbon and the sulfhydryl-modified nano-magnetized activated carbon as listed in Table 1) used in the adsorption reaction was added in an amount of 0.5-2.5 g/1000 mL.

The wastewater containing $Cu^{2+}$ was treated in batches, and the results obtained using various amounts of the adsorbent were shown in Table 1.

TABLE 1 the removal rate of $Cu^{2+}$ from the wastewater adding various amounts of the adsorbent

| type of the adsorbent | amount of the adsorbent (g/1000 mL) | | | | |
|---|---|---|---|---|---|
| | 0.5 | 1.0 | 1.5 | 2.0 | 2.5 |
| | removal rate of $Cu^{2+}$ (%) | | | | |
| activated carbon | 38.2 | 44.5 | 46.7 | 47.7 | 48.9 |
| nano-magnetized activated carbon | 52.7 | 66.7 | 85.8 | 89.8 | 92.1 |
| sulfhydryl-modified nano-magnetized activated carbon | 69.6 | 88.4 | 92.9 | 99.5 | 99.6 |

Example 2

The volume of a target wastewater to be treated for an adsorption reaction was 1000 mL;
the temperature of the target wastewater was 25° C.;
the target wastewater contained a heavy metal, $Cr^{3+}$, and an initial concentration of $Cr^{3+}$ in the target wastewater was 5 mg/L;
the initial pH value of the target wastewater was 2.0;
the adsorption reaction was performed for 240 min;
the adsorbent (activated carbon, nano-magnetized activated carbon and sulfhydryl-modified nano-magnetized activated carbon as listed in Table 2) used in the adsorption reaction was added in an amount of 2 g/1000 mL.

The wastewater containing $Cr^{3+}$ was treated in batches, and the results obtained under various adsorption time were shown in Table 2.

TABLE 2 the removal rate of $Cr^{3+}$ from the wastewater under various adsorption time

| type of the adsorbent | adsorption time (min) | | | | | | |
|---|---|---|---|---|---|---|---|
| | 5 | 15 | 30 | 60 | 120 | 180 | 240 |
| | removal rate of $Cr^{3+}$ (%) | | | | | | |
| activated carbon | 25.6 | 32.4 | 36.8 | 39.3 | 45.6 | 48.7 | 48.9 |
| nano-magnetized activated carbon | 28.3 | 41.6 | 48.2 | 67.0 | 82.5 | 93.6 | 95.3 |
| sulfhydryl-modified nano-magnetized activated carbon | 43.7 | 56.6 | 68.4 | 82.5 | 93.6 | 99.1 | 99.0 |

It can be seen from the examples that the activated carbon exhibits a certain adsorption and removal performance for heavy metals $Cu^{2+}$ and $Cr^{3+}$ in wastewater; the nano-magnetized activated carbon exhibits a significantly increased adsorption and removal performance for $Cu^{2+}$ and $Cr^{3+}$; while the sulfhydryl-modified nano-magnetized activated carbon exhibits a more significantly increased adsorption and removal performance for $Cu^{2+}$ and $Cr^{3+}$, showing that under a certain condition, the removal rate for $Cu^{2+}$ and $Cr^{3+}$ by the sulfhydryl-modified nano-magnetized activated carbon could reaches 99% or higher. Moreover, due to its magnetic performance, the sulfhydryl-modified nano-magnetized activated carbon could be well recovered and reused under the action of external magnetism, achieving the effect of efficiently removing heavy metal ions such as $Cu^{2+}$ and $Cr^{3+}$ in wastewater.

In the present disclosure, the parameters of each device, such as the size and the flow rate, are determined according to the conditions such as the scale of wastewater to be treated. The method according to the present disclosure is operated in batches and has strong adaptability.

Finally, it should be noted that the above embodiments are only used to illustrate the technical solution of the present disclosure, but not to limit it. Although the present disclosure has been described in detail with reference to the foregoing embodiments, those of ordinary skill in the art should understand that the technical solutions described in the foregoing embodiments could still be modified, or some or all of the technical features could be equivalently replaced, and these modifications or replacements do not make the corresponding technical solutions essentially deviate from the scope of the technical solutions of each embodiment of the present disclosure.

What is claimed is:

1. A method for separating and removing heavy metals from wastewater using a sulfhydryl-modified nano-magnetized activated carbon, comprising step 1, preparing a sulfhydryl-modified nano-magnetized activated carbon: adding an activated carbon into a mixed solution of $FeCl_2$ and $FeCl_3$ for a reduction reaction at a pH value of 10-11, and a temperature of 70-80° C. for 60 min, and then aging at ambient temperature for 24 h, to form $Fe_3O_4$ on the activated carbon, obtaining a nano-magnetized activated carbon, wherein a mass ratio of the activated carbon to $Fe_3O_4$ formed is 1:1, 1:2 or 1:3; subjecting the nano-magnetized activated carbon to a sulfhydryl modification, to obtain a sulfhydryl-modified nano-magnetized activated carbon;

step 2, introducing wastewater: introducing heavy-metal-containing wastewater into a batch reactor via a water inlet pipe;

step 3, stirring: turning a stirring device inside the batch reactor on for stirring;

step 4, adding the sulfhydryl-modified nano-magnetized activated carbon obtained in step 1 into the batch reactor;

step 5, performing an adsorption reaction while stirring in the batch reactor, to adsorb heavy metals in the wastewater by the sulfhydryl-modified nano-magnetized activated carbon;

step 6, separating: after the adsorption reaction, precipitating the sulfhydryl-modified nano-magnetized activated carbon under a magnetic field generated by a magnetic separator, obtaining a precipitated sulfhydryl-modified nano-magnetized activated carbon and a supernate;

step 7, opening a water outlet pipe after the separating, to discharge the supernate; and step 8, opening a sludge outlet at the bottom of the batch reactor, to discharge the precipitated sulfhydryl-modified nano-magnetized activated carbon, thereby completing a treatment cycle.

* * * * *